May 14, 1957 E. KLEEMANN ET AL 2,792,066
CENTER BEARING MOUNTING MEANS FOR VEHICLE PROPELLER SHAFT
Filed April 6, 1955 2 Sheets-Sheet 1
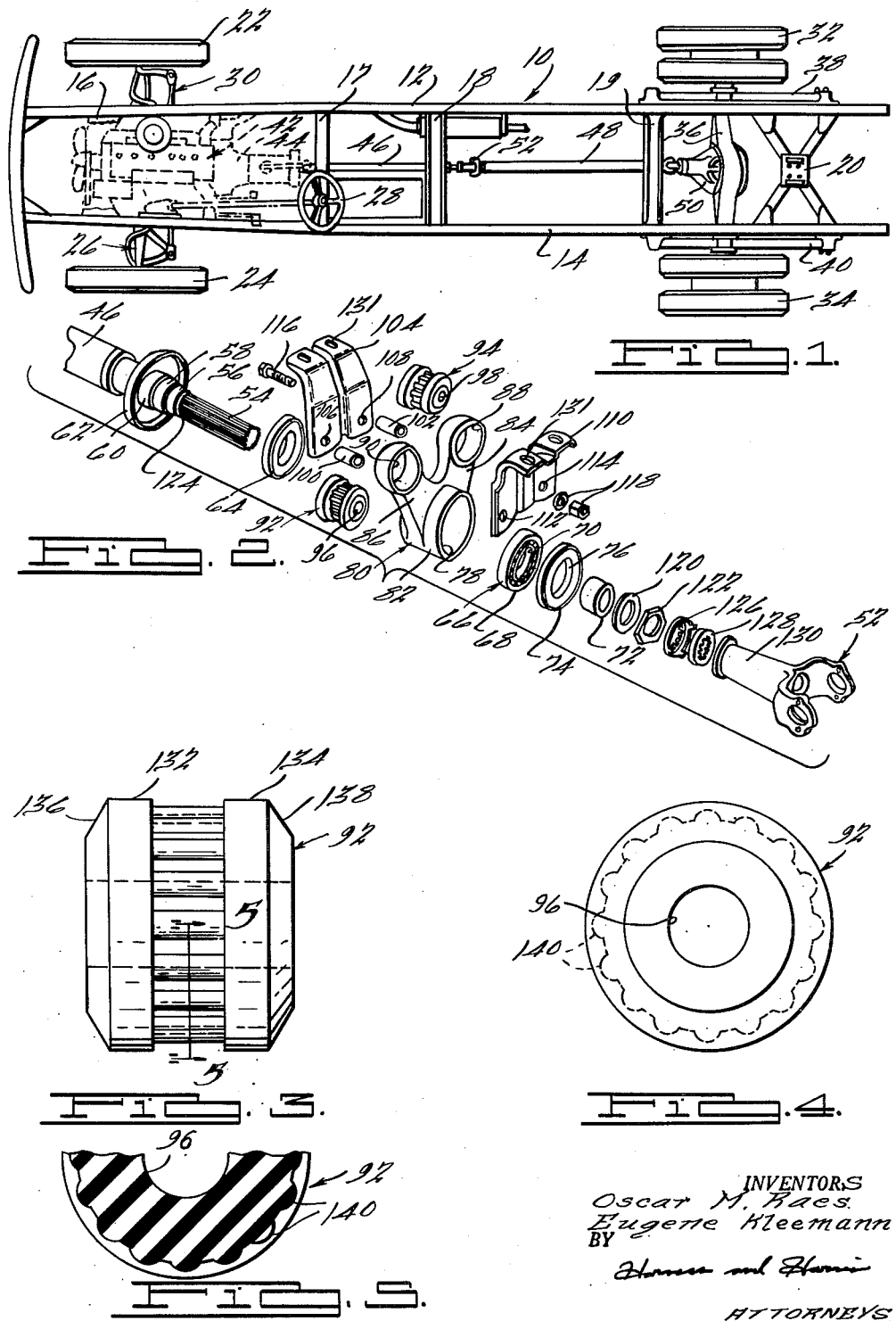
INVENTORS
Oscar M. Raes
Eugene Kleemann
BY
ATTORNEYS May 14, 1957  E. KLEEMANN ET AL  2,792,066
CENTER BEARING MOUNTING MEANS FOR VEHICLE PROPELLER SHAFT
Filed April 6, 1955  2 Sheets-Sheet 2
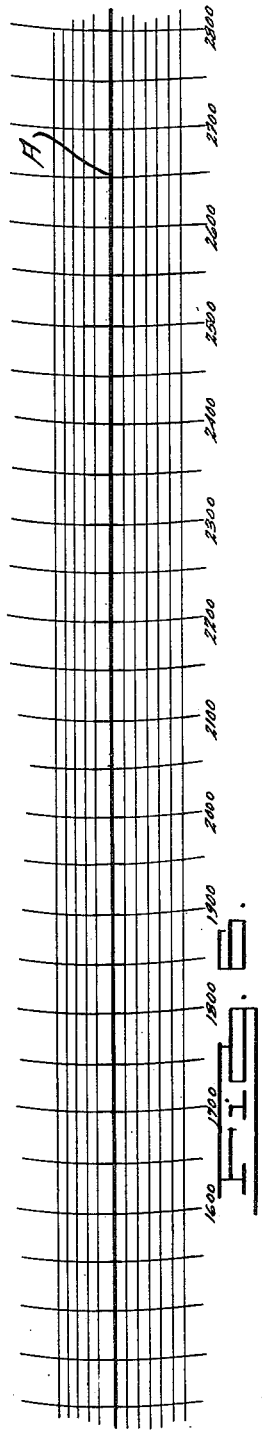
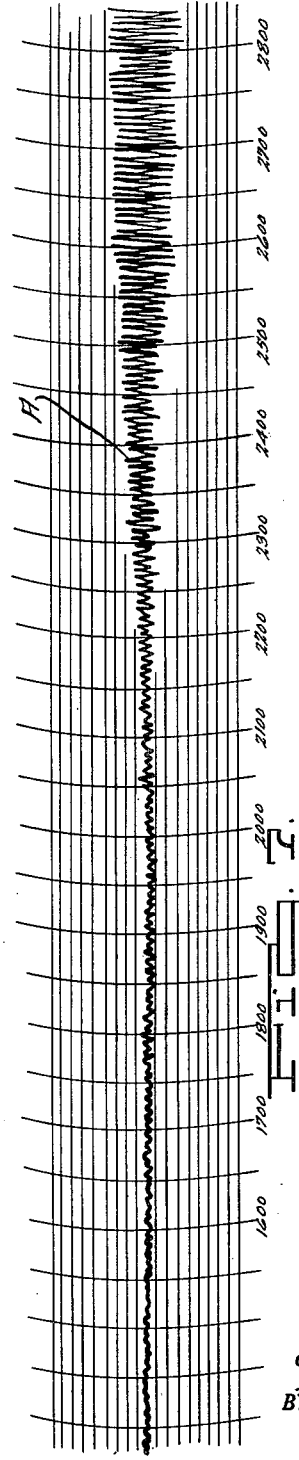
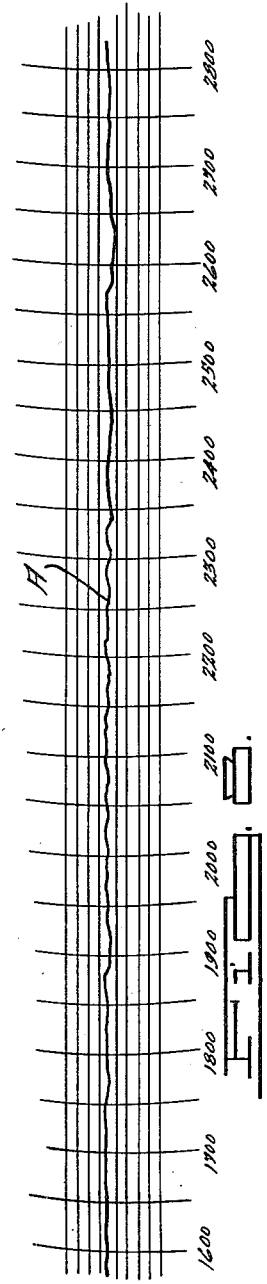
INVENTORS
Oscar M. Raes.
Eugene Kleemann
BY
ATTORNEYS

United States Patent Office 2,792,066
Patented May 14, 1957

2,792,066

CENTER BEARING MOUNTING MEANS FOR VEHICLE PROPELLER SHAFT

Eugene Kleemann, Fraser, and Oscar M. Raes, Utica, Mich., assignors to Chrysler Corporation, Highland Park, Mich., a corporation of Delaware Application April 6, 1955, Serial No. 499,578

5 Claims. (Cl. 180—70)

Our invention relates generally to wheeled vehicles such as trucks, busses and other wheeled vehicles and more particularly to a new and improved means for mounting the vehicle propeller shaft, said propeller shaft extending from the vehicle transmission to the differential and axle assembly for the driving or traction wheels.

It is common practice to provide trucks, busses and other wheeled vehicles with a rear wheel drive and to mount the vehicle power plant and speed reduction transmission at the forward portion of the vehicle. This necessitates the use of a relatively long propeller shaft to provide a powered connection between the transmission and the differential gear means at the rear of the vehicle. For convenience, the propeller shaft is formed in two parts and the individual parts are commonly joined together by a suitable universal joint and slip yoke connection. This two-part propeller shaft construction reduces the distance between supports and thereby reduces the severity of forced vibrations created therein during operation. However, such a construction introduces the need for providing a resilient support structure at the juncture of the two parts of the propeller shaft, said support structure usually being carried by a cross member of the vehicle frame.

Suitable resilient insulators are normally employed for the purpose of reducing vibration of the propeller shaft components in the vicinity of this intermediate support structure and for preventing the transfer of dynamic disturbances in the propeller shaft assembly to the vehicle frame and the vehicle super structure carried by the frame.

A principal feature of our instant invention resides in the provision of a new and improved insulator between the center bearing structure for the propeller shaft and the portions of the supporting structure which are integrally joined to the above-mentioned frame cross member. These insulators function as vibration dampers and the damping characteristics thereof are such that the damping forces produced thereby are increased as the vibrational disturbances in the propeller shaft are increased. By way of contrast, the conventional insulators commonly employed in similar applications are designed so that they function to dampen the more severe vibrational disturbances which are encountered during operation, and since the damping characteristics thereof are substantially constant, the damping forces applied to the propeller shaft assembly during minor vibrational disturbances are relatively large, it therefore follows that the conventional intermediate bearing structure for a two-part propeller shaft is adapted to transmit a relatively large percentage of the vibrational disturbances in the propeller shaft to the frame.

The provision of an improved propeller shaft mounting means of the type briefly mentioned above being the principal object of our invention, it is another object of my invention to provide a propeller shaft mounting means having resilient insulators with variable damping characteristics.

It is another object of our invention to provide a new and improved mounting means for a two-part propeller shaft as above described, wherein the resilient insulators for resiliently supporting the propeller shaft center bearing mounting structure to the vehicle frame are of a simplified construction which may be readily adapted to be used with propeller shaft assemblies of known construction.

It is another object of our invention to provide a new and improved mounting means for a vehicle propeller shaft which functions to substantially eliminate the transfer of vibrational disturbances created within the propeller shaft during operation to the vehicle frame and other parts of the vehicle.

It is another object of our invention to provide a new and improved means for mounting the center bearing structure of a two-part vehicle propeller shaft which is characterized by its unique mode of operation.

For the purpose of particularly describing the structure of our instant invention, reference will be made to the accompanying drawings in which:

Figure 1 shows the principal portions of a typical truck chassis together with the principal power train elements;

Figure 2 is an exploded view of a portion of the propeller shaft assembly including a means for mounting the center bearing structure to the structure of the frame of the chassis shown in Figure 1;

Figure 3 is a detail elevational view of a resilient bushing or insulator used with the center bearing mounting structure shown in Figure 2;

Figure 4 is a side view of the insulator of Figure 3;

Figure 5 is a cross sectional view of a portion of the insulator of Figure 3 and is taken along section line 5—5 of Figure 3;

Figure 6 shows a calibration line for an instrument which is capable of permanently recording the magnitude of the vibrational disturbances transferred through a propeller shaft mounting means for a wheeled vehicle;

Figure 7 is a reproduction of a permanent recording of the magnitude of the vibrational disturbances delivered to the structural frame of the chassis of Figure 1 through a typical propeller shaft mounting means of the type which have heretofore been employed in the art. This figure has been included herewith merely for the purpose of comparing the damping characteristics of the mounting structure of our instant invention with that of the conventional type; and Figure 8 is a reproduction of a permanent recording of the magnitude of the vibrational disturbances delivered to the structural frame of the chassis of Figure 1 through the propeller shaft mounting means of my instant invention.

Referring first to Figure 1, the numeral 10 is used to generally designate the structural frame of a typical truck chassis and it comprises a pair of side rail members 12 and 14 and a plurality of structural cross members 16, 17, 18, 19, and 20. A pair of forward dirigible wheels 22 and 24 are mounted adjacent the forward end of the structural frame assembly by a suitable suspension mechanism generally indicated at 26. An operator controlled steering wheel 28 is positioned as shown in a conventional manner and may be operatively connected to the dirigible wheels 22 and 24 by a conventional steering linkage mechanism generally indicated at 30 for effecting turning maneuvers of the wheel.

Driving traction wheels are mounted at the rear portion of the chassis 10 as indicated at 32 and 34. The wheels 32 and 34 are secured to separate parts of a two-part axle shaft, the latter being rotatably mounted within an axle shaft housing 36. The axle shaft housing 36 is suspended at two spaced locations by leaf springs 38 and 40 which in turn are end-supported by the frame side rails 12 and 14. A vehicle engine 42 may be mounted within the forward portion of the chassis structure as shown. A multiple speed reduction gear transmission 44 may be secured to the engine block of the engine 42 in a conventional manner and the input gear element thereof may be drivably connected to the engine crankshaft to effect a power delivery path. The output gear element on the transmission 44 may be drivably connected to the two-part axle shaft for the rear traction wheels 32 and 34 by means of a propeller shaft assembly comprising a first shaft extension 46 and a second shaft extension 48, one end of the latter being coupled to the power input member of a conventional differential assembly 50 for the two-part rear axle. The other end of the shaft extension 48 is connected to the adjacent end of the shaft extension 46 by means of the universal coupling 52. The shaft extensions 46 and 48 may be supported in the vicinity of their juncture by means of the frame cross member 18, said shaft extensions extending below this cross member 18 in close proximity thereto. The means for supporting the shaft extensions 46 and 48 to the frame cross member 18 comprises the subject matter of our instant invention and for this purpose we have particularly illustrated in Figure 2 the component elements of this mounting means to show each of the constituent elements thereof.

Referring next to Figure 2, the end portion of the shaft extension 46 is longitudinally splined, as shown at 54, and is formed with a stepped diameter section at the inner end of the splined portion 54, the smallest diameter portion of this section being designated by numeral 56, the intermediate diameter portion of this section being designated by numeral 58 and the largest diameter portion being designated by numeral 60. A protective guard 62 is formed on the shaft extension 46 adjacent the largest diameter portion 60 of the above-mentioned stepped diameter shaft section and it comprises a radially extending disc having an axially flanged periphery. A conventional oil seal 64 may be received over the end of the shaft extension 46 and it is adapted to encircle the large diameter portion 60 and to sealingly engage the same.

A bearing element is generally designated by numeral 66 and is provided with a circular outer bearing race 68 and an inner bearing race 70. Bearing element 66 may be received over the end of the shaft extension 46 and the inner bearing race 70 is adapted to encircle the intermediate diameter portion 58 above described. A bushing or spacer element 72 may be inserted within the central opening of a second oil seal 74 so that the outer periphery of the spacer 72 is sealingly engaged by the inner sealing lip 76 of the seal 74. The spacer 72 with its surrounding seal 74 may then be received over the end of the shaft extension 46 until the spacer 72 surrounds the smallest diameter portion 56 of the stepped shaft section above described. The outside diameter of the spacer 72 is substantially the same as the outside diameter of the largest diameter portion 60 of the stepped shaft section.

The seals 64 and 74 and the bearing 66 are received within a cylindrical opening 78 in a housing 80 so that the outer race 68 of the bearing 66 and the outer peripheries of the oil seals 64 and 74 securely engage the interior cylindrical surface of the opening 78. The housing 80 is comprised of a main cylindrical body portion 82 and a pair of upwardly extending wings shown at 84 and 86, said wings preferably being cast integrally with the body portion 82. Each of the wings 84 and 86 is formed with a large eyelet as indicated at 88 and 90 respectively, said eyelets comprising cylindrical openings having their axes extending substantially in the direction of the axis of the shaft extension 46. A rubber insulator 92 may be received within the eyelet 90, and similarly another insulator 94 may be received within the eyelet 88, these insulators 92 and 94 being provided with axially extending openings shown at 96 and 98 respectively. Spacer inserts 100 and 102 may be received within the axially extending insulator openings 96 and 98 respectively, said spacer inserts being provided with an axially extending central opening.

A bracket 104 may be positioned adjacent one side of the housing 80 and it is provided with a pair of bolt holes 106 and 108 which are aligned with the openings within the spacer bushings 100 and 102 respectively. Similarly, a second bracket 110 may be positioned adjacent the other side of the housing 80 and it is also provided with a pair of bolt holes 112 and 114 which are aligned with the openings in the spacer bushings 100 and 102 respectively. A clamping bolt 116 extends through the aligned openings 106 and 112 and the spacer bushing 100, and another clamping bolt 116 extends through the aligned openings 108 and 114 and the spacer bushing 102. A nut and washer are shown at 118 which are received over the ends of the bolts 116.

A lock washer 120 is slidably received over the splined shaft portion 54 and a nut 122 may also be received over the end of the splined shaft portion 54, said nut 122 being threadably engaged with threads 124 formed at one end of the splined shaft portion 54. The nut 122 is thereby effective to securely hold the spacer element 72 in engagement with one side of the inner race 70 of the bearing element 66, while the other side of the bearing race 70 engages the shoulder formed between the large diameter portion 60 and the intermediate diameter portion 58 of the stepped shaft section. A cap 126 and a washer 128 may also be received over the end of the splined shaft portion 54, and finally, a slip yoke 130 may be slidably received over the extreme end of the splined shaft portion 54, said yoke 130 being provided with an internally splined opening for this purpose. The yoke 130 constitutes a portion of the above-described universal connection 52.

The brackets 104 and 110 are substantially angular in construction and are adapted to be bolted to the under side of the frame cross member 18, suitable bolt holes 131 being provided for this purpose.

Referring next to the detail view of Figures 3, 4, and 5, we have illustrated in more particular detail the structural characteristics of the rubber bushing or insulator 92. It will be understood, however, that this insulator 92 is identical to the insulator 94 above mentioned. It is apparent from an inspection of Figures 3, 4, and 5 that the insulator 92 is substantially cylindrical in construction and is provided with a pair of circular peripheral shoulders identified by numerals 132 and 134. The axial ends of the insulator 92 are tapered as shown at 136 and 138, to define a frustum of a cone. The portion of the insulator 92 intermediate the two axially spaced shoulders 132 and 134 is formed with a plurality of substantially evenly spaced ribs 140. By preference each of the ribs 140 is provided with a circular cross section, as best seen in Figure 5, and they extend parallel to the axis of the central opening 96.

In operation the forced vibrations produced and transmitted by the propeller shaft extensions 46 and 48 cause the insulators 92 and 94 to deflect so that the center lines of the spacer inserts 100 and 102 are displaced from the center line of the eyelet openings 90 and 88 respectively. This deflection of the insulators 92 and 94 produces a variable resistance to the forced vibrations, the magnitude of the resistance being proportional to the magnitude of the forced vibrations. This variable damping characteristic produced by the insulators 92 and 94 arises by reason of the slight resistance offered by the ribs to initial deflection and to the relatively large resistance offered by the ribs to larger deflections.

The low damping rate feature above described is effective to isolate vibrations existing in the propeller shaft assembly but they are also effective to maintain the location of the propeller shaft components during rapid vibrations of relatively great magnitude.

For the purpose of illustrating graphically the extent to which the improved mounting means of our instant invention will isolate vibrations of the propeller shaft assembly, we have shown in Figures 6, 7, and 8 permanent recordings that were obtained during a test of the actual embodiment. In Figure 6 we have shown a strip of test paper which was moved from right to left during the test period at a predetermined speed as the engine speed of the test vehicle was varied from approximately 500 R. P. M. to about 3500 R. P. M. As the test strip was moved, the pen was caused to trace the line indicated by the letter A. The test strip and the pen A above mentioned were components of a conventional vibration recorder and the vibration pickup device to which the instrument was sensitive was secured to the frame cross member 18 shown in Figure 1. The trace line A, as shown in Figure 6, represents a normal calibration line which would represent a completely vibration-free installation. The trace line A, as shown in Figure 7, represents the magnitude of the vibrations obtained with a conventional mounting structure which did not employ the improved resilient insulators 92 and 94 of our instant invention. The extent of the vibrations in the speed range from 2,000 to 3,000 R. P. M. is excessive. The deviation of the trace line A from the normal represented in Figure 6 is an indication of the extent of the severity of the vibrations at any given speed.

By way of contrast, the test trace obtained by using the mounting means of my instant invention, as seen in Figure 8, it may be observed that the trace line A shown in Figure 8 is substantially flat throughout the entire operating speed range of the engine and that the deviations from the numeral shown in Figure 6 for the same speed range are relatively slight in comparison to that shown in the above-described Figure 7. The reason for the more effective insulating properties of the mounting means of our instant invention resides in the improved construction of the insulator bushings 92 and 94.

Since the insulators of our instant invention are characterized by a variable damping characteristic, as above described, it is possible to form the same with a relatively large outside diameter and the additional rubber of which the bushings are comprised further tends to isolate the propeller shaft vibrations.

Having thus described a preferred embodiment of our instant invention, as required by the patent statutes, what we claim and desire to secure by United States Letters Patent is:

1. In a mounting for a propeller shaft of an automotive vehicle, a housing having said shaft journaled therein and also having a pair of eyelets, an insulator associated with each eyelet and comprising a unitary structure of compressible resilient material having a central portion of reduced diameter extending axially through the eyelet and spacing a pair of peripheral shoulders adjacent the axially opposed ends of the eyelet, the central portion having a plurality of integral circumferentially spaced radially projecting ribs engaging the interior wall of the eyelet, a pair of spacers extending axially through said insulators respectively in supporting relation, a pair of brackets spaced axially by said spacers, means securing said brackets to said spacers adjacent the axially opposite ends of said insulators, and means securing each bracket to said vehicle at axially spaced locations.

2. In a mounting for a propeller shaft of an automotive vehicle, a housing having said shaft journaled therein and also having a pair of eyelets at opposite sides of said shaft and abovev the latter, a unitary insulator of resilient compressible material associated with each eyelet and extending axially therethrough, each insulator having a plurality of integral circumferentially spaced radially projecting ribs engaging the interior wall of the associated eyelet, a pair of spacers extending axially through said insulators respectively in supporting relation, and a pair of brackets spaced axially by said insulators, each bracket having lower portions secured to said spacers at the adjacent ends thereof and having upper portions secured to said vehicle at axially spaced locations substantially directly above said lower portions.

3. In an automotive vehicle having a frame and a propeller shaft comprising two parts joined end-to-end by a universal coupling, a housing having one of the parts of said shaft journaled therein adjacent said coupling and also having a pair of eyelets adjacent said coupling at opposite sides of said shaft and above the latter, an insulator associated with each eyelet and comprising a unitary structure of compressible resilient material having a central portion of reduced diameter extending axially through the eyelet and spacing a pair of peripheral shoulders adjacent the axially opposed ends of the eyelet, the central portion having a plurality of integral circumferentially spaced radially projecting ribs extending axially between said shoulders and engaging the interior wall of the eyelet, a pair of spacers extending axially through said insulators respectively in supporting relation, and a pair of brackets spaced axially by said spacers and depending from said frame, the lower portions of each bracket being secured to said spacers at the adjacent ends thereof.

4. In an automotive vehicle having a frame, a propeller shaft extending longitudinally of the vehicle and comprising two parts joined end-to-end by a universal coupling, a transverse member of said frame above said shaft adjacent said coupling, a housing having one of the parts of said shaft journaled therein adjacent said coupling and also having a pair of cylindrical eyelets adjacent said coupling at opposite sides of said shaft and above the latter, the axes of said eyelets extending longitudinally of said vehicle, an insulator associated with each eyelet and comprising a unitary structure of compressible resilient material having a central portion of reduced diameter extending axially through the eyelet and spacing a pair of peripheral shoulders adjacent the axially opposed ends of the eyelet, the central portion having a plurality of integral circumferentially spaced radially projecting ribs extending axially between said shoulders and engaging the interior wall of the eyelet, a pair of spacers extending axially through said insulators respectively in supporting relation, a pair of brackets spaced axially by said spacers and depending from said transverse member, each bracket being secured adjacent its lower end to both of said spacers at the adjacent ends of the latter.

5. In an automotive vehicle having a frame, a propeller shaft extending longitudinally of the vehicle and comprising two parts joined end-to-end by a universal coupling, a transverse member of said frame above said shaft adjacent said coupling, a housing having one of the parts of said shaft journaled therein adjacent said coupling and also having a pair of cylindrical eyelets adjacent said coupling at opposite sides of said shaft and above the latter, the axes of said eyelets extending longitudinally of said vehicle, a unitary insulator of resilient compressible material associated with each eyelet and extending axially therethrough, each insulator having a plurality of integral circumferentially spaced ribs parallel to the axis of the associated eyelet and projecting radially into engagement with the interior wall of the eyelet, a pair of spacers extending axially through said insulators respectively in supporting relation, and a pair of brackets spaced axially by said spacers and depending from said transverse member, each bracket being secured adjacent its lower end to both of said spacers at the adjacent ends of the latter.

References Cited in the file of this patent
UNITED STATES PATENTS

| | | |
|---|---|---|
| 2,382,246 | McFarland | Aug. 14, 1945 |
| 2,674,330 | Feil | Apr. 6, 1954 |